United States Patent
Glahn et al.

(10) Patent No.: US 11,905,841 B1
(45) Date of Patent: Feb. 20, 2024

(54) BUFFER AIR METHOD AND SYSTEM FOR A BEARING COMPARTMENT

(71) Applicant: Raytheon Technologies Corporation, Farmington, CT (US)

(72) Inventors: Jorn A. Glahn, Manchester, CT (US); Collin P. Fitzgerald, S. Glastonbury, CT (US); Gregory M. Dooley, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/105,632

(22) Filed: Feb. 3, 2023

(51) Int. Cl.
*F01D 25/22* (2006.01)
*F01D 25/16* (2006.01)
*F02C 7/06* (2006.01)

(52) U.S. Cl.
CPC ............. *F01D 25/22* (2013.01); *F01D 25/16* (2013.01); *F02C 7/06* (2013.01); *F05D 2220/32* (2013.01)

(58) Field of Classification Search
CPC . F01D 25/22; F01D 25/16; F02C 7/06; F05D 2220/32
See application file for complete search history.

(56) References Cited

U.S. PATENT DOCUMENTS

| | | | | |
|---|---|---|---|---|
| 3,528,241 A * | 9/1970 | Gill, Jr. | ...................... | F02C 7/06 184/6 |
| 7,836,675 B2 * | 11/2010 | Corattiyil | .................. | F02C 7/06 60/39.08 |
| 8,235,647 B2 | 8/2012 | Pisseloup | | |
| 8,366,382 B1 * | 2/2013 | Muldoon | .................. | F02C 7/06 60/785 |
| 9,617,916 B2 * | 4/2017 | Légaré | ....................... | F02C 7/06 |
| 10,487,734 B2 * | 11/2019 | Munsell | .................. | F01D 11/06 |
| 11,499,476 B2 | 11/2022 | Munsell | | |
| 2009/0293445 A1 * | 12/2009 | Ress, Jr. | ................... | F02K 3/04 60/39.15 |
| 2023/0304444 A1 * | 9/2023 | Alecu | ..................... | F01D 9/065 60/782 |

* cited by examiner

*Primary Examiner* — Jesse S Bogue
(74) *Attorney, Agent, or Firm* — Getz Balich LLC (57) ABSTRACT

A method of operation is provided during which buffer air flows into a buffer cavity in a turbine engine. The buffer cavity surrounds a bearing compartment in the turbine engine. Leakage air flows across a buffer seal device in the turbine engine. The buffer air and the leakage air are combined to provide combined air. The combined air is vented to a pressure sink such that: a pressure of the buffer air within the buffer cavity is maintained at or below a maximum buffer air threshold during operation of the turbine engine; and a flowrate of the leakage air across the buffer seal device is maintained at or above a minimum leakage air threshold during the operation of the turbine engine.

18 Claims, 7 Drawing Sheets

BUFFER AIR METHOD AND SYSTEM FOR A BEARING COMPARTMENT

GOVERNMENT LICENSE RIGHTS

This invention was made with Government support awarded by the United States. The Government has certain rights in this invention.

BACKGROUND OF THE DISCLOSURE

1. Technical Field

This disclosure relates generally to a turbine engine and, more particularly, to providing buffer air for a bearing compartment.

2. Background Information

It is known in the art to surround a bearing compartment with buffer air. Various systems and methods are known in the art for providing buffer air. While these known systems and methods have various benefits, there is still room in the art for improvement. There is a need in the art, for example, for systems and methods which may provide buffer air at a reduced pressure during one or more modes of turbine engine operation, without disrupting other internal air system functions requiring a continuous supply of high pressure air from a system surrounding the bearing compartment.

SUMMARY OF THE DISCLOSURE

According to an aspect of the present disclosure, a method of operation is provided during which buffer air flows into a buffer cavity in a turbine engine. The buffer cavity surrounds a bearing compartment in the turbine engine. Leakage air flows across a buffer seal device in the turbine engine. The buffer air and the leakage air are combined to provide combined air. The combined air is vented to a pressure sink such that: a pressure of the buffer air within the buffer cavity is maintained at or below a maximum buffer air threshold during operation of the turbine engine; and a flowrate of the leakage air across the buffer seal device is maintained at or above a minimum leakage air threshold during the operation of the turbine engine.

According to another aspect of the present disclosure, a method of designing is provided during which a maximum buffer air threshold is identified for buffer air within a buffer cavity in a turbine engine. The buffer cavity is outboard of a bearing compartment in the turbine engine. A minimum leakage air threshold is identified for leakage air across a buffer seal device from a high pressure cavity in the turbine engine to a low pressure cavity in the turbine engine. The low pressure cavity is outboard of the buffer cavity. The high pressure cavity is outboard of the low pressure cavity. The buffer air combines with the leakage air within the low pressure cavity to provide combined air. A venting procedure is provided to vent the combined air from the low pressure cavity such that: a pressure of the buffer air within the buffer cavity is maintained at or below the maximum buffer air threshold during operation of the turbine engine; and a flowrate of the leakage air across the buffer seal device is maintained at or above the minimum leakage air threshold during the operation of the turbine engine.

According to still another aspect of the present disclosure, an assembly is provided for a turbine engine. This assembly includes a stationary structure, a vent line, a valve and a control system. The stationary structure forms a bearing compartment, a buffer cavity, a low pressure cavity and a high pressure cavity. The buffer cavity is outboard of the bearing compartment. The low pressure cavity is outboard of the buffer cavity. The high pressure cavity is outboard of the low pressure cavity. The vent line is fluidly coupled with the low pressure cavity. The low pressure cavity is configured to direct leakage air from the high pressure cavity and buffer air from the buffer cavity into the vent line as low pressure air. The valve is fluidly coupled with and downstream of the vent line. The control system is configured to signal the valve to control venting of the low pressure air from the low pressure cavity through the vent line such that: a pressure of the buffer air within the buffer cavity is maintained at or below a maximum buffer air threshold; and a flowrate of the leakage air across the buffer seal device is maintained at or above a minimum leakage air threshold.

The valve may be configured as a two-position valve or a variable position valve.

The combined air may be to be vented using a valve. The maximum buffer air threshold may be identified to account for variation in operation of the valve, deterioration of the valve and/or hysteresis of the valve.

The combined air may be vented to the pressure sink through a valve.

The valve may be configured as a discrete position valve.

The valve may be configured as a variable position valve.

The method may also include controlling operation of the valve using an electronic control system for the turbine engine.

The method may also include: monitoring an operational parameter of the turbine engine; and controlling operation of the valve based on the operational parameter.

At least some of the combined air may be vented to the pressure sink throughout the operation of the turbine engine.

The leakage air may flow across the buffer seal device from a high pressure cavity in the turbine engine to a low pressure cavity in the turbine engine. The buffer air may be combined with the leakage air in the low pressure cavity. The low pressure cavity may surround the buffer cavity. The high pressure cavity may surround the low pressure cavity.

A low pressure cavity wall in the turbine engine may include a sidewall and an endwall. The sidewall may be radially between and may form the low pressure cavity and the high pressure cavity. The endwall may project radially inward from the sidewall. The endwall may be axially between and may form the low pressure cavity and the high pressure cavity. The buffer seal device may seal a gap between the endwall and a rotating structure in the turbine engine.

The buffer cavity may be radially adjacent the bearing compartment. In addition or alternatively, the low pressure cavity may be radially adjacent the buffer cavity. In addition or alternatively, the high pressure cavity may be radially adjacent the low pressure cavity.

The buffer cavity may axially overlap the bearing compartment. In addition or alternatively, the low pressure cavity may axially overlap the buffer cavity. In addition or alternatively, the high pressure cavity may axially overlap the low pressure cavity.

A diffuser plenum in the turbine engine may surround the high pressure cavity. A combustor in the turbine engine may be disposed within the diffuser plenum.

The high pressure cavity may be radially inboard of a core flowpath within the turbine engine.

A bearing compartment wall in the turbine engine may include a sidewall, a first endwall and a second endwall. The sidewall may be radially between and may form the bearing compartment and the buffer cavity. The first endwall may project radially inward from the sidewall. The first endwall may be axially between and may form the bearing compartment and the buffer cavity. The second endwall may project radially inward from the sidewall. The second endwall may be axially between and may form the bearing compartment and the buffer cavity.

A bearing compartment wall in the turbine engine may be disposed between and may form the bearing compartment and the buffer cavity. Each of a plurality of bearing seal devices in the turbine engine may seal a respective gap between the bearing compartment wall and a rotating structure in the turbine engine. The bearing compartment may be disposed axially between the bearing seal devices.

Both the buffer cavity and the bearing compartment may be formed by a stationary structure and a rotating structure in the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
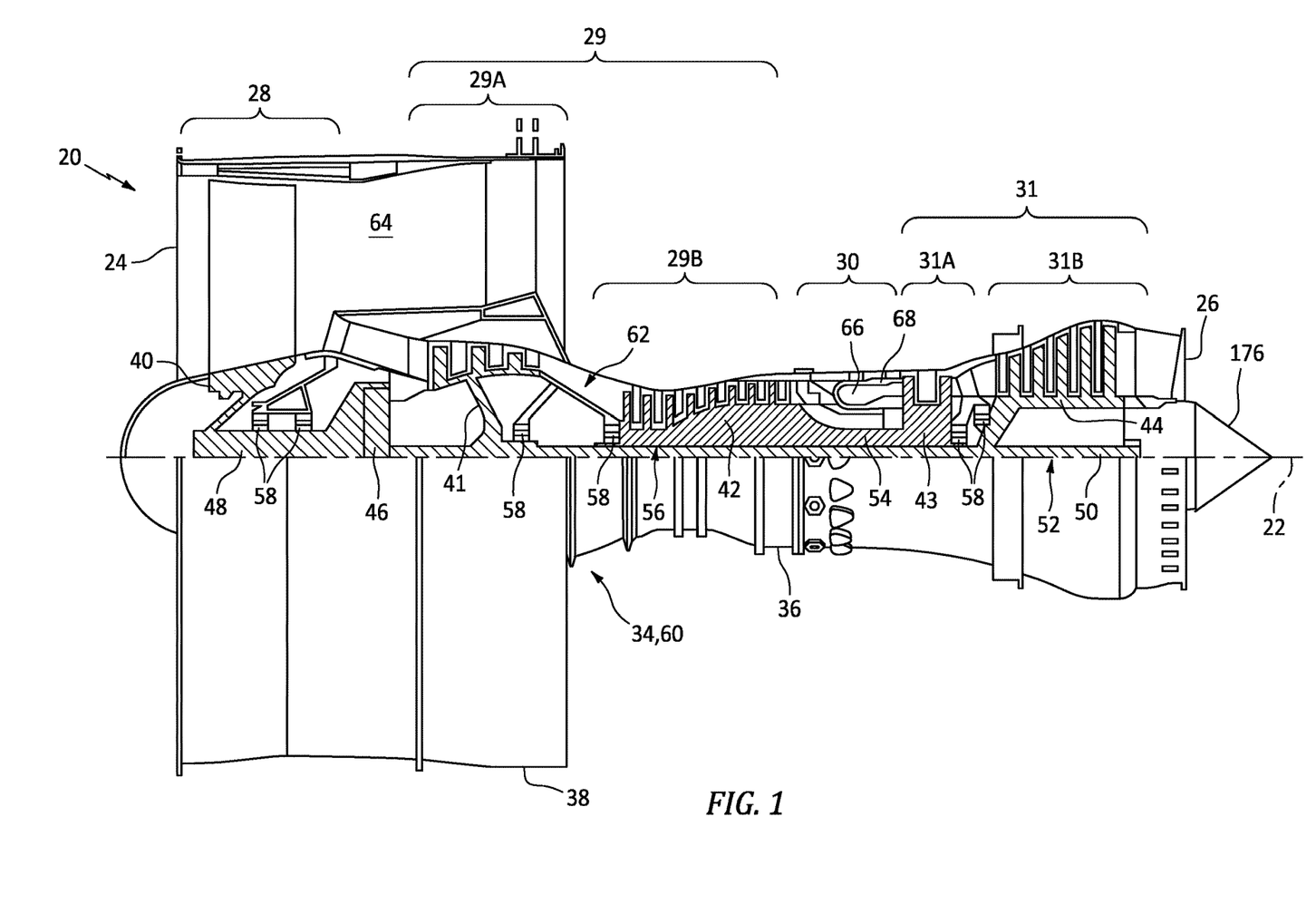
FIG. 1 is a side cutaway illustration of a gas turbine engine.

FIG. 1 is a side cutaway illustration of a gas turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the turbine engine 20. The outer case 38 may house at least the fan section 28.

Each of the engine sections 28, 29A, 29B, 31A and 31B includes a respective bladed rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 50. At least (or only) the LPC rotor 41, the LPT rotor 44 and the low speed shaft 50 may collectively form a low speed rotating structure 52; e.g., a low speed spool. The HPC rotor 42 is connected to and driven by the HPT rotor 43 through a high speed shaft 54. At least (or only) the HPC rotor 42, the HPT rotor 43 and the high speed shaft 54 may collectively form a high speed rotating structure 56; e.g., a high speed spool. Each of the engine rotating structures 52, 56 and each of the engine shafts 48, 50, 54 is rotatably support by a plurality of bearings 58, some of which are schematically shown in FIG. 1. Each of these bearings 58 is connected to the engine housing 34 by an internal engine structure; e.g., duct walls, support structures (e.g., struts, frames, etc.) and the like. At least (or only) the internal engine structure and the engine housing 34 may collectively form a stationary structure 60 of the turbine engine 20.

During operation, air enters the turbine engine 20 through the airflow inlet 24. This air is directed through the fan section 28 and into a core flowpath 62 and a bypass flowpath 64. The core flowpath 62 extends sequentially through the LPC section 29A, the HPC section 29B, the combustor section 30, the HPT section 31A and the LPT section 31B; e.g., the engine core. The air within the core flowpath 62 may be referred to as "core air". The bypass flowpath 64 extends through a bypass duct, which bypasses the engine core. The air within the bypass flowpath 64 may be referred to as "bypass air".

The core air is compressed by the LPC rotor 41 and the HPC rotor 42 and directed into a combustion chamber 66 of a (e.g., annular) combustor 68 in the combustor section 30. Fuel is injected into the combustion chamber 66 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which fan rotor 40 propels bypass air through and out of the bypass flowpath 64. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

Figure 2:
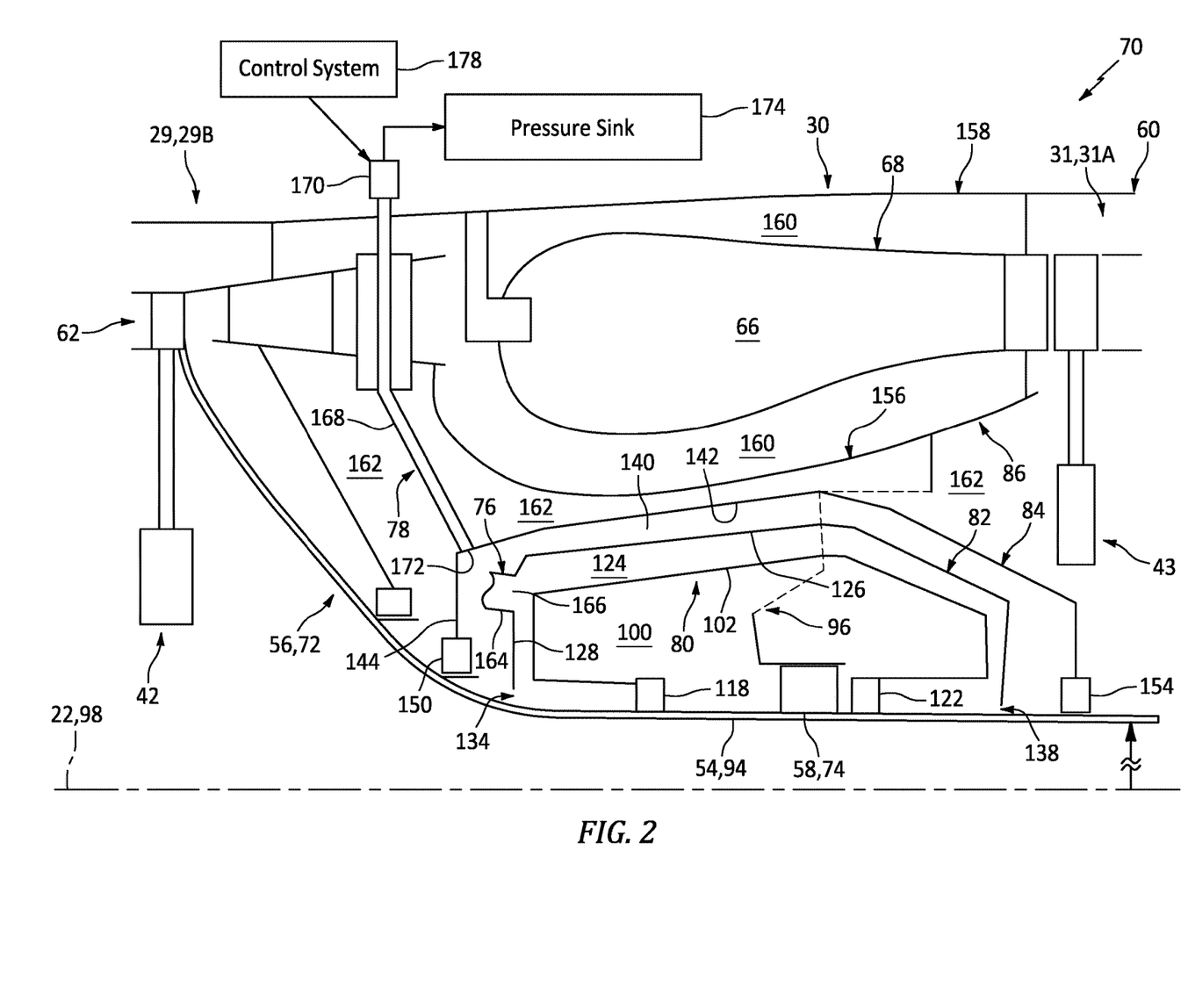
FIG. 2 is a partial schematic illustration of an engine assembly.

FIG. 2 illustrates an assembly 70 for the turbine engine 20. This engine assembly 70 includes an engine rotating structure 72 (e.g., the high speed rotating structure 56), an engine bearing 74 (e.g., one of the bearings 58), the stationary structure 60, a buffer air system 76 and an air relief system 78. The stationary structure 60 of FIG. 2 includes a bearing compartment wall 80, a buffer cavity wall 82, a low pressure (LP) cavity wall 84, a diffuser structure 86 and the combustor 68.

Figure 3:
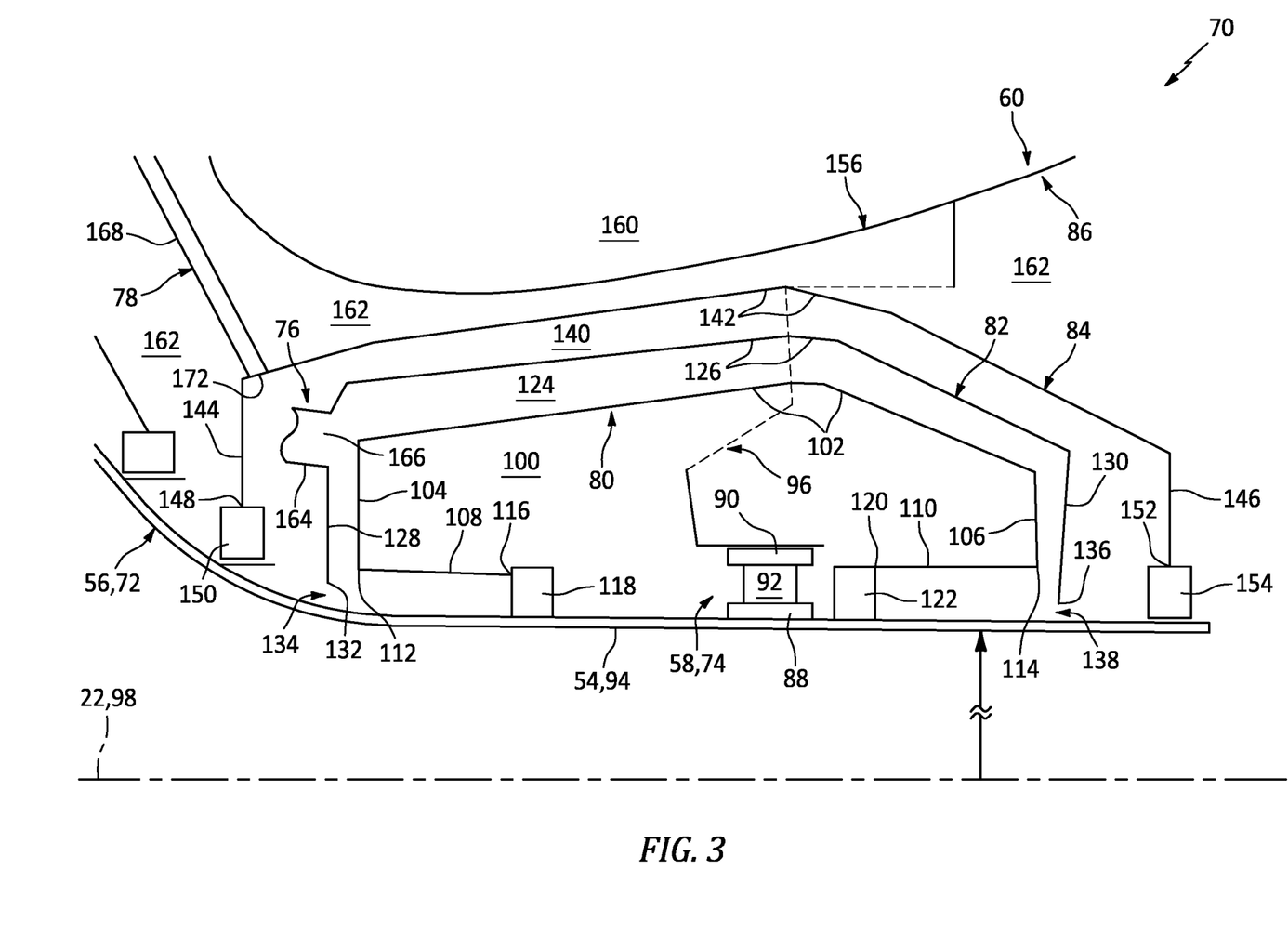
FIG. 3 is a schematic illustration of a portion of the engine assembly.

Referring to FIG. 3, the engine bearing 74 is configured to rotatably couple the engine rotating structure 72 to the stationary structure 60. The stationary structure 60 may thereby rotatably support the engine rotating structure 72 through the engine bearing 74. Examples of the engine bearing 74 include, but are not limited to, a rolling element bearing and/or a thrust bearing. The engine bearing 74 of FIG. 3, for example, includes a bearing inner race 88, a bearing outer race 90 and a plurality of bearing elements 92. The inner race 88 is mounted onto the engine rotating structure 72; e.g., onto a shaft 94 (e.g., the high speed shaft 54) of the engine rotating structure 72. The outer race 90 circumscribes the inner race 88 and is mounted to a bearing support 96 of the stationary structure 60. The bearing elements 92 are distributed circumferentially around a rotational axis 98 (e.g., the axial centerline 22) of the engine rotating structure 72 in a circular array. This array of the bearing elements 92 is disposed radially between and engaged with (e.g., contacts, rolls along, etc.) the inner race 88 and the outer race 90.

The bearing compartment wall 80 is configured to form a bearing compartment 100 in which the engine bearing 74 is housed. The bearing compartment wall 80 of FIG. 3, for example, forms a radial outer peripheral boundary of the bearing compartment 100. The bearing compartment wall 80 may also form one or more axial end peripheral boundaries of the bearing compartment 100. An inner peripheral boundary of the bearing compartment 100, however, may be formed by a combination of the bearing compartment wall 80 and the engine rotating structure 72 and its engine shaft 94. In other embodiments, it is contemplated the inner peripheral boundary of the bearing compartment 100 may be (e.g., completely) formed by the engine rotating structure 72 and its engine shaft 94 and/or otherwise formed without the bearing compartment wall 80. The bearing compartment wall 80 of FIG. 3 includes a bearing compartment sidewall 102, a bearing compartment first endwall 104 and a bearing compartment second endwall 106. The bearing compartment 100 may also include a bearing compartment first endwall rim 108 ("first rim") and/or a bearing compartment second endwall rim 110 ("second rim").

The sidewall 102 is disposed at and/or along a radial outer side of the bearing compartment 100. The sidewall 102 extends axially along the rotational axis 98 between and to the first endwall 104 and the second endwall 106. The sidewall 102 extends circumferentially about (e.g., completely around) the rotational axis 98. The sidewall 102 may thereby circumscribe the engine rotating structure 72 and form the radial outer peripheral boundary of the bearing compartment 100. The sidewall 102 of FIG. 3 has a non-straight (e.g., curved, bowed, bent, convex, splined, etc.) sectional geometry when viewed, for example, in a reference plane parallel with (e.g., including) the rotational axis 98; e.g., plane of FIG. 3. The present disclosure, however, is not limited to such an exemplary bearing compartment sidewall geometry.

The first endwall 104 is disposed at and/or along an axial first end of the bearing compartment 100. The first endwall 104 is connected to (e.g., formed integral with or attached to) the sidewall 102. The first endwall 104 of FIG. 3 projects radially inward (towards the rotational axis 98) from the sidewall 102 to a distal inner end 112 of the first endwall 104, which distal inner end 112 is spaced radially outboard of the engine rotating structure 72 by a gap; e.g., an air gap. The first endwall 104 extends circumferentially about (e.g., completely around) the rotational axis 98. The first endwall 104 may thereby circumscribe the engine rotating structure 72 and form the first axial end peripheral boundary of the bearing compartment 100.

The second endwall 106 is disposed at and/or along an axial second end of the bearing compartment 100. The second endwall 106 is connected to (e.g., formed integral with or attached to) the sidewall 102. The second endwall 106 of FIG. 3 projects radially inward (towards the rotational axis 98) from the sidewall 102 to a distal inner end 114 of the second endwall 106. This distal inner end 114 is spaced radially outboard of the engine rotating structure 72 by a gap; e.g., an air gap. The second endwall 106 extends circumferentially about (e.g., completely around) the rotational axis 98. The second endwall 106 may thereby circumscribe the engine rotating structure 72 and form the second axial end peripheral boundary of the bearing compartment 100.

The first rim 108 is disposed at and/or along a radial inner side of the bearing compartment 100. The first rim 108 is connected to (e.g., formed integral with or attached to) the first endwall 104. The first rim 108 of FIG. 3 projects axially out from the first endwall 104, along the rotational axis 98 and the engine rotating structure 72 towards the second endwall 106 and/or the second rim 110, to a distal end 116 of the first rim 108. The first rim 108 is spaced radially outboard from the engine rotating structure 72 by a gap; e.g., an air gap. The first rim 108 extends circumferentially about (e.g., completely around) the rotational axis 98. The first rim 108 may thereby circumscribe the engine rotating structure 72.

A bearing compartment first seal device 118 ("first bearing seal device") is arranged with the bearing compartment wall 80 and its first rim 108 at (e.g., on, adjacent or proximate) the distal end 116 of the first rim 108. This first bearing seal device 118 is configured to seal an annular gap between (a) the bearing compartment wall 80 and its first rim 108 and (b) the engine rotating structure 72. Examples of the first bearing seal device 118 include, but are not limited to, a face seal device and a carbon seal device.

The second rim 110 is disposed at and/or along the radial inner side of the bearing compartment 100. The second rim 110 is connected to (e.g., formed integral with or attached to) the second endwall 106. The second rim 110 of FIG. 3 projects axially out from the second endwall 106, along the rotational axis 98 and the engine rotating structure 72 towards the first endwall 104 and/or the first rim 108, to a distal end 120 of the second rim 110. The second rim 110 is spaced radially outboard from the engine rotating structure 72 by a gap; e.g., an air gap. The second rim 110 extends circumferentially about (e.g., completely around) the rotational axis 98. The second rim 110 may thereby circumscribe the engine rotating structure 72.

A bearing compartment second seal device 122 ("second bearing seal device") is arranged with the bearing compartment wall 80 and its second rim 110 at (e.g., on, adjacent or proximate) the distal end 120 of the second rim 110. This second bearing seal device 122 is configured to seal an annular gap between (a) the bearing compartment wall 80 and its second rim 110 and (b) the engine rotating structure 72. Examples of the second bearing seal device 122 include, but are not limited to, a face seal device and a carbon seal device.

With the foregoing arrangement, the bearing compartment 100 is arranged and extends axially between and to the first endwall 104 and the second endwall 106. The bearing compartment 100 is also arranged and extends axially between and to axially the first bearing seal device 118 and the second bearing seal device 122, where the engine bearing 74 is arranged axially between the first bearing seal device 118 and the second bearing seal device 122. A first end portion of the bearing compartment 100 is arranged and extends radially between and to the first rim 108 and the sidewall 102. A second end portion of the bearing compartment 100 is arranged and extends radially between and to the second rim 110 and the sidewall 102. An intermediate portion of the bearing compartment 100 is arranged and extends radially between and to the engine rotating structure 72 and the sidewall 102. This bearing compartment 100 further extends circumferentially about (e.g., completely around) the rotational axis 98. The bearing compartment 100 may thereby circumscribe the engine rotating structure 72 and its engine shaft 94.

The buffer cavity wall 82 is configured to form a buffer cavity 124. The buffer cavity wall 82 of FIG. 3, for example, forms a radial outer peripheral boundary of the buffer cavity 124. The buffer cavity wall 82 may also form one or more axial end peripheral boundaries of the buffer cavity 124. An inner peripheral boundary of the buffer cavity 124, however, may be formed by a combination of the bearing compartment wall 80 and the engine rotating structure 72 and its engine shaft 94. The buffer cavity wall 82 of FIG. 3 includes a buffer cavity sidewall 126, a buffer cavity first endwall 128 and a buffer cavity second endwall 130.

The sidewall 126 is disposed at and/or along a radial outer side of the buffer cavity 124. The sidewall 126 extends axially along the rotational axis 98 between and to the first endwall 128 and the second endwall 130. The sidewall 126 extends circumferentially about (e.g., completely around) the rotational axis 98. The sidewall 126 may thereby circumscribe the engine rotating structure 72 and the sidewall 102, and form the radial outer peripheral boundary of the buffer cavity 124. The sidewall 126 of FIG. 3 has a non-straight (e.g., curved, bowed, bent, convex, splined, etc.) sectional geometry when viewed, for example, in the reference plane; e.g., the plane of FIG. 3. The present disclosure, however, is not limited to such an exemplary buffer cavity sidewall geometry.

The first endwall 128 is disposed at and/or along an axial first end of the buffer cavity 124. The first endwall 128 is connected to (e.g., formed integral with or attached to) the sidewall 126. The first endwall 128 of FIG. 3 projects radially inward (towards the rotational axis 98) from the sidewall 126 to a distal inner end 132 of the first endwall 128. This distal inner end 132 is spaced radially outboard of the engine rotating structure 72, which may provide a (e.g., annular) first control leakage gap 134 radially between the first endwall 128 and the engine rotating structure 72. The first endwall 128 extends circumferentially about (e.g., completely around) the rotational axis 98. The first endwall 128 may thereby circumscribe the engine rotating structure 72 and form the first axial end peripheral boundary of the buffer cavity 124.

The second endwall 130 is disposed at and/or along an axial second end of the buffer cavity 124. The second endwall 130 is connected to (e.g., formed integral with or attached to) the sidewall 126. The second endwall 130 of FIG. 3 projects radially inward (towards the rotational axis 98) from the sidewall 126 to a distal inner end 136 of the second endwall 130. This distal inner end 136 is spaced radially outboard of the engine rotating structure 72, which may provide a (e.g., annular) second control leakage gap 138 radially between the second endwall 130 and the engine rotating structure 72. The second endwall 130 extends circumferentially about (e.g., completely around) the rotational axis 98. The second endwall 130 may thereby circumscribe the engine rotating structure 72 and form the second axial end peripheral boundary of the buffer cavity 124.

With the foregoing arrangement, the buffer cavity 124 is arranged axially between the first endwall 128 and the second endwall 130. The buffer cavity 124 is arranged radially between the sidewall 126 and the engine rotating structure 72 and its engine shaft 94. This buffer cavity 124 further extends circumferentially about (e.g., completely around) the rotational axis 98. The buffer cavity 124 may thereby circumscribe the engine rotating structure 72 and its engine shaft 94 as well as the bearing compartment wall 80. The buffer cavity 124 of FIG. 3 therefore is (e.g., radially) outboard of and surrounds (in a radial direction and/or an axial direction) the bearing compartment 100. In particular, an outer portion of the buffer cavity 124 extends radially between and to the sidewall 102 and the sidewall 126. A first end portion of the buffer cavity 124 extends axially between and to the first endwall 104 and the first endwall 128. A second end portion of the buffer cavity 124 extends axially between and to the second endwall 106 and the second endwall 130. A first inner portion of the buffer cavity 124 extends radially between and to the first rim 108 and the engine rotating structure 72 and its engine shaft 94. This first inner portion also extend axially between and to the first bearing seal device 118 and the first endwall 128 and its first control leakage gap 134. A second inner portion of the buffer cavity 124 extends radially between and to the second rim 110 and the engine rotating structure 72 and its engine shaft 94. This second inner portion also extend axially between and to the second bearing seal device 122 and the second endwall 130 and its second control leakage gap 138.

The LP cavity wall 84 is configured to form a low pressure (LP) cavity 140. The LP cavity wall 84 of FIG. 3, for example, forms a radial outer peripheral boundary of the LP cavity 140. The LP cavity wall 84 may also form one or more axial end peripheral boundaries of the LP cavity 140. An inner peripheral boundary of the LP cavity 140, however, may be formed by a combination of the buffer cavity wall 82 and the engine rotating structure 72 and its engine shaft 94. The LP cavity wall 84 of FIG. 3 includes a low pressure (LP) cavity sidewall 142, a low pressure (LP) cavity first endwall 144 and a low pressure (LP) cavity second endwall 146.

The sidewall 142 is disposed at and/or along a radial outer side of the LP cavity 140. The sidewall 142 extends axially along the rotational axis 98 between and to the first endwall 144 and the second endwall 146. The sidewall 142 extends circumferentially about (e.g., completely around) the rotational axis 98. The sidewall 142 may thereby circumscribe the engine rotating structure 72, the sidewall 126 and the sidewall 102, and form the radial outer peripheral boundary of the LP cavity 140. The sidewall 142 of FIG. 3 has a non-straight (e.g., curved, bowed, bent, convex, splined, etc.) sectional geometry when viewed, for example, in the reference plane; e.g., the plane of FIG. 3. The present disclosure, however, is not limited to such an exemplary LP cavity sidewall geometry.

The first endwall 144 is disposed at and/or along an axial first end of the LP cavity 140. The first endwall 144 is connected to (e.g., formed integral with or attached to) the sidewall 142. The first endwall 144 of FIG. 3 projects radially inward (towards the rotational axis 98) from the sidewall 142 to a distal inner end 148 of the first endwall 144. This distal inner end 148 is spaced radially outboard of the engine rotating structure 72. The first endwall 144 extends circumferentially about (e.g., completely around) the rotational axis 98. The first endwall 144 may thereby circumscribe the engine rotating structure 72.

A first buffer seal device 150 (e.g., a low pressure (LP) cavity seal device) is arranged with the LP cavity wall 84 and its first endwall 144 at (e.g., on, adjacent or proximate) the distal end 148 of the first endwall 144. This first buffer seal device 150 is configured to seal an annular gap between (a) the LP cavity wall 84 and its first endwall 144 and (b) the engine rotating structure 72. Examples of the first buffer seal device 150 include, but are not limited to, a face seal device, a carbon seal device, a brush seal device, a circumferentially segmented seal device, a KE seal device, a controlled gap seal device and a non-contact seal device. Examples of the non-contact seal device include, but are not limited to, a hydrostatic non-contact seal device and a hydrodynamic non-contact seal device.

The second endwall 146 is disposed at and/or along an axial second end of the LP cavity 140. The second endwall 146 is connected to (e.g., formed integral with or attached to) the sidewall 142. The second endwall 146 of FIG. 3 projects radially inward (towards the rotational axis 98) from the sidewall 142 to a distal inner end 152 of the second endwall 146. This distal inner end 152 is spaced radially outboard of the engine rotating structure 72. The second endwall 146 extends circumferentially about (e.g., completely around) the rotational axis 98. The second endwall 146 may thereby circumscribe the engine rotating structure 72.

A second buffer seal device 154 (e.g., a low pressure (LP) cavity seal device) is arranged with the LP cavity wall 84 and its second endwall 146 at (e.g., on, adjacent or proximate) the distal end 152 of the second endwall 146. This second buffer seal device 154 is configured to seal an annular gap between (a) the LP cavity wall 84 and its second endwall 146 and (b) the engine rotating structure 72. Examples of the second buffer seal device 154 include, but are not limited to, a face seal device, a carbon seal device, a brush seal device, a circumferentially segmented seal device, a KE seal device, a controlled gap seal device and a non-contact seal device. Examples of the non-contact seal device include, but are not limited to, a hydrostatic non-contact seal device and a hydrodynamic non-contact seal device.

With the foregoing arrangement, the LP cavity 140 is arranged axially between the first endwall 144 and the second endwall 146. The LP cavity 140 is arranged radially between the sidewall 142 and the engine rotating structure 72 and its engine shaft 94. This LP cavity 140 further extends circumferentially about (e.g., completely around) the rotational axis 98. The LP cavity 140 may thereby circumscribe the engine rotating structure 72 and its engine shaft 94 as well as the bearing compartment wall 80 and the buffer cavity wall 82. The LP cavity 140 of FIG. 3 therefore is (e.g., radially) outboard of and surrounds (in a radial direction and/or an axial direction) the bearing compartment 100 and the buffer cavity 124. In particular, an outer portion of the LP cavity 140 extends radially between and to the sidewall 126 and the sidewall 142. A first end portion of the LP cavity 140 extends axially between and to the first endwall 128 and the first endwall 144. This first end portion also extends axially between and to (or about) the first control leakage gap 134 and the first buffer seal device 150. A second end portion of the LP cavity 140 extends axially between and to the second endwall 130 and the second endwall 146. This second end portion also extends axially between and to (or about) the second control leakage gap 138 and the second buffer seal device 154.

Referring to FIG. 2, the diffuser structure 86 includes an inner diffuser case 156, an outer diffuser case 158 and a diffuser plenum 160. The inner diffuser case 156 extends axially along the rotational axis 98, and may axially overlap at least a portion (or an entirety of) the LP cavity wall 84. The inner diffuser case 156 extends circumferentially about (e.g., completely around) the rotational axis 98. The inner diffuser case 156 may thereby circumscribe the engine rotating structure 72, the sidewall 142, the sidewall 126 and the sidewall 102. This inner diffuser case 156 is also spaced radially outboard from the LP cavity wall 84 and its sidewall 142. The outer diffuser case 158 extends axially along the rotational axis 98, and may axially overlap at least a portion (or an entirety of) the inner diffuser case 156. The outer diffuser case 158 extends circumferentially about (e.g., completely around) the rotational axis 98. The outer diffuser case 158 may thereby circumscribe the inner diffuser case 156. This outer diffuser case 158 is also spaced radially outboard from the inner diffuser case 156. The diffuser plenum 160 may thereby be arranged radially between and formed by the inner diffuser case 156 and the outer diffuser case 158. This diffuser plenum 160 extends circumferentially about (e.g., completely around) the rotational axis 98.

With the foregoing arrangement, the stationary structure 60 and the engine rotating structure 72 may collectively form a high pressure (HP) cavity 162. This HP cavity 162 is arranged and extends radially between and to the LP cavity wall 84 and the inner diffuser case 156. The HP cavity 162 is located (e.g., radially) outboard of and (e.g., radially and/or axially) surrounds the LP cavity wall 84 and the LP cavity 140. The LP cavity wall 84 of FIG. 2, for example, is disposed radially and/or axially within the HP cavity 162.

The combustor 68 is disposed within the diffuser plenum 160. Here, the diffuser plenum 160 may receive compressed air from the HPC section 29B. The compressed air is diffused within the diffuser plenum 160, and the diffused air is directed into the combustor 68 and its combustion chamber 66 for mixing with the fuel and subsequent combustion. Thus, the core flowpath 62 is located radially outboard of the HP cavity 162, the LP cavity 140, the buffer cavity 124 and the bearing compartment 100.

The buffer air system 76 is configured to deliver (e.g., relatively cool, high pressure) buffer air to the buffer cavity 124. This buffer air may be air bled from the core flowpath 62 out of the compressor section 29 (e.g., the HPC section 29B), and then run through a heat exchanger (e.g., a cooler). The buffer air system 76 of FIG. 2 includes a buffer air conduit 164 (e.g., a pipe, a hose, etc.) which directs the buffer air into the buffer cavity 124. The buffer air conduit 164, for example, may be fluidly coupled with a port 166 in the buffer cavity wall 82 and its first endwall 128.

The air relief system 78 is configured to regulate fluid pressure (e.g., air pressure) within the LP cavity 140 and, thus, the fluidly coupled buffer cavity 124. The air relief system 78 of FIG. 2, for example, includes a vent line 168 (e.g., a conduit) and a flow regulator 170 (e.g., a valve). The vent line 168 is fluidly coupled with a port 172 in the LP cavity wall 84 and its sidewall 142 (or the first endwall 144), and extends to the flow regulator 170. The flow regulator 170 is fluidly coupled between the vent line 168 and a pressure sink 174; e.g., the bypass flowpath 64 (see FIG. 1), an environment external to the turbine engine 20, a tail cone 176 for the turbine engine 20 (see FIG. 1), etc. The flow regulator 170 may be configured to adjust airflow out of the LP cavity 140 through the vent line 168 based on a mode of engine operation. For example, during an intermediate engine power setting (e.g., aircraft cruise), the flow regulator 170 may prevent or reduce the airflow vented to the pressure sink 174 from the LP cavity 140. This may reduce losses and, thus, increase engine efficiency at the intermediate engine power setting. However, during a high engine power setting (e.g., aircraft takeoff), the flow regulator 170 may increase the airflow vented to the pressure sink 174 from the LP cavity 140. This may reduce air pressure within the LP cavity 140 as well as the buffer cavity 124, which may reduce parasitic losses (e.g., drag) on the engine rotating structure 72 and its engine shaft 94. It is believed the reduction is parasitic losses will outweigh any efficiency losses due to the increased venting. Reducing the air pressure within the buffer cavity 124 also reduces pressure forces on (e.g., pressure differential across) the bearing seal devices 118 and 122. In addition or alternatively, during a low engine power setting (e.g., aircraft landing, aircraft taxiing, etc.), the flow regulator 170 may also reduce the airflow vented to the pressure sink 174 from the LP cavity 140 to ensure, for example, minimum leakage air flow requirements across the bearing seal devices 118 and 122 are met; e.g., to prevent backflow across the bearing seal devices 118 and 122. To facilitate the foregoing flow regulator operation, actuation of the flow regulator 170 may be controlled by an electronic control system 178; e.g., a FADEC or other controller for the turbine engine 20.

Figure 4:
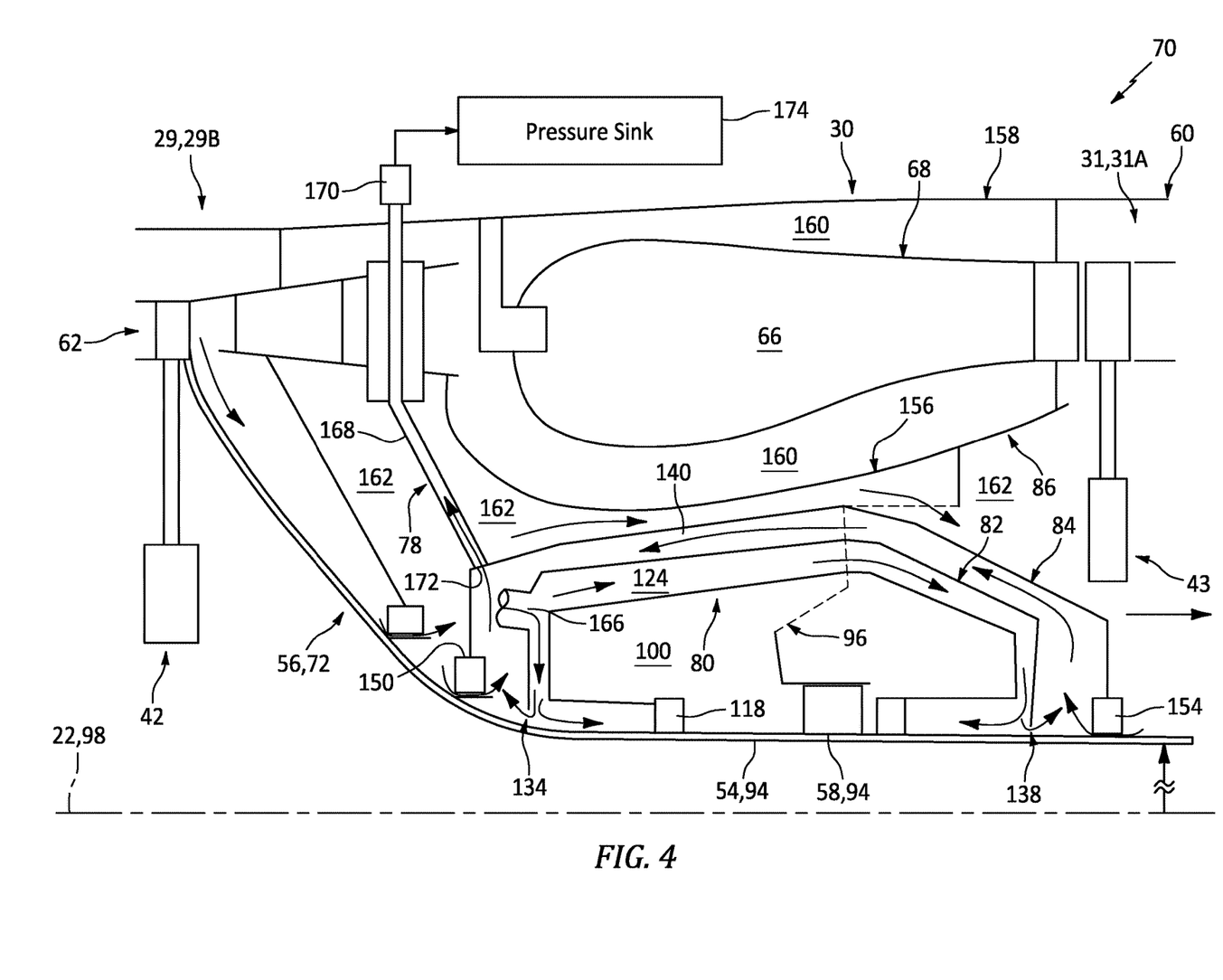
FIG. 4 is a partial schematic illustration of the engine assembly with flow arrows for a mode of operation.

Referring to FIG. 4, during operation of the engine assembly 70, high pressure core air is bled from the core flowpath 62 and directed into the HP cavity 162. A majority of this high pressure bleed air may pass through the HP cavity 162 for routing to one or more other areas of the turbine engine 20; e.g., to a turbine rotor for cooling, etc. Some of the high pressure bleed air, however, may leak across one or more of the buffer seal devices 150 and 154 into the LP cavity 140. Concurrently, the buffer air is directed into the buffer cavity 124 from the buffer air system 76 and its buffer air conduit 164. This buffer air provides an insulative barrier between the relatively cool air in the bearing compartment 100 and the relatively hot bleed air in the HP cavity 162. The buffer air flows through the buffer cavity 124 and is directed into the LP cavity 140 through one or more of the control leakage gaps 134 and 138. The buffer air and the bleed air (e.g., the air leaked across buffer seal devices 150 and 154) in the LP cavity 140 combine to provide combined air; e.g., low pressure (LP) air. This combined air flows within the LP cavity 140 and its selectively vented through the air relief system 78 using the flow regulator 170.

The flow regulator 170 of FIG. 2 may be controlled by the control system 178 to maintain a pressure of the buffer air in the buffer cavity 124 within a select pressure range during turbine engine operation. The flow regulator 170 may also or alternatively be controlled by the control system 178 to maintain a flowrate of the leakage air across each buffer seal device 150, 154 within a select flowrate range during turbine engine operation. The combined air, for example, may be vented from the LP cavity 140 through the air relief system 78 and its members 168 and 170 to the pressure sink 174 such that: (A) the pressure of the buffer air in the buffer cavity 124 is maintained at or below a maximum buffer air threshold; and (B) the flowrate of the leakage air across each buffer seal device 150, 154 is maintained at or above a minimum leakage air threshold. The maximum buffer air threshold may be selected based on various parameters including, but not limited to: potential parasitic losses (e.g., drag) on the engine rotating structure 72 and its engine shaft 94; and/or pressure differential tolerances for the bearing seal devices 118 and 122. The maximum buffer air threshold may also be selected (e.g., adjusted from a target) to account for: variation in flow regulator operation; deterioration of the flow regulator 170 and/or hysteresis in flow regulator actuation (e.g., actuation delay in opening or closing the valve).

The minimum leakage air threshold may be selected based on various parameters including, but not limited to: flow requirements for seal device cooling/frictional heat mitigation (e.g., particularly for contact seal devices such as brush seals); flow requirements for proper operation of non-contact seal devices; and pressure requirements for proper operation of non-contact seal devices.

Figure 5:
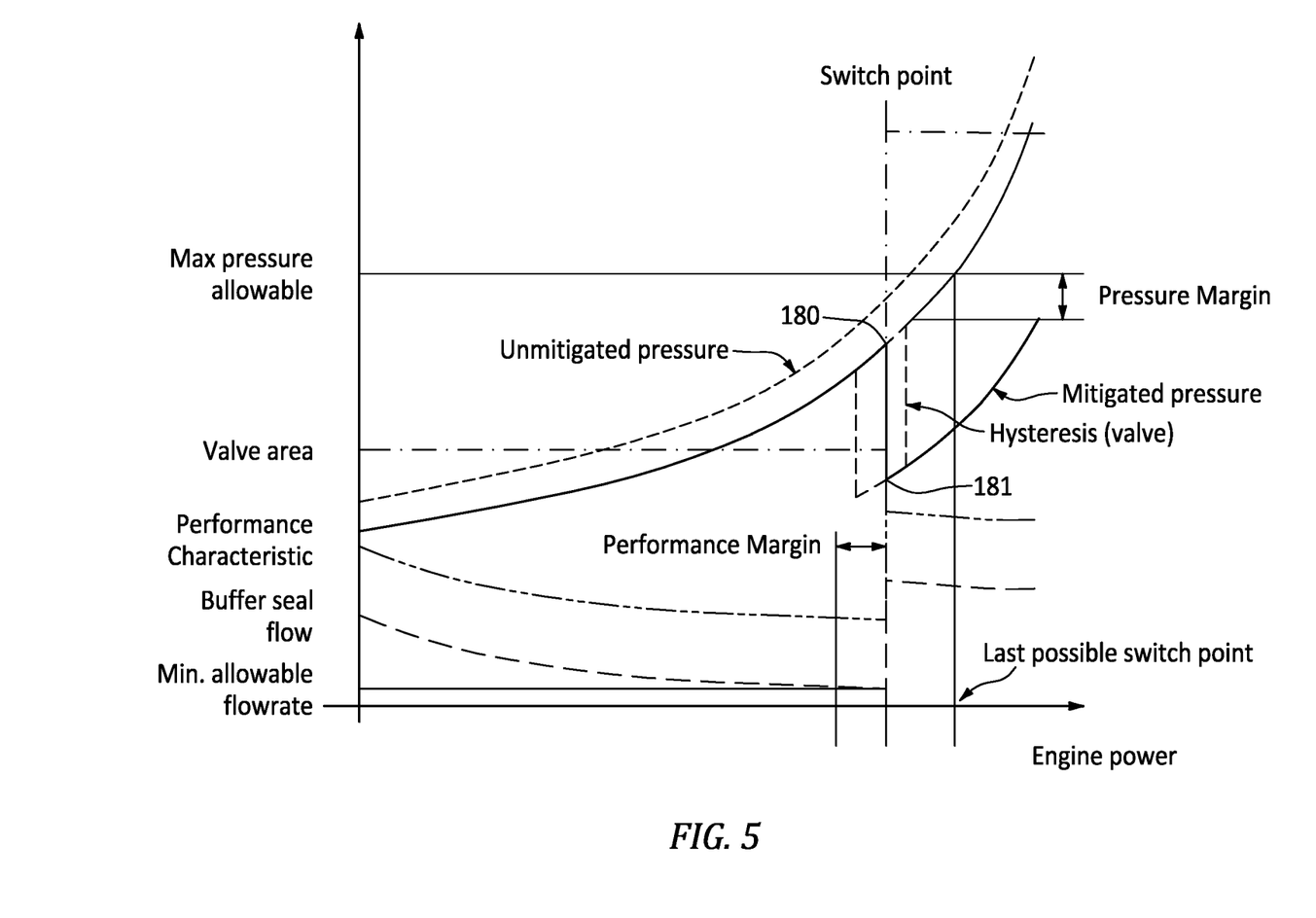
FIG. 5 is a graphical depiction of operation of the engine assembly with a discrete position valve.

FIG. 5 is a graphical depiction of operation of the engine assembly 70 where the flow regulator 170 is configured as a discrete position valve; e.g., a two position valve. The flow regulator 170, for example, is operable in (e.g., only) a low flow position and a high flow position. In the low flow position, the flow regulator 170 has a non-zero first flow area. In the high flow position, the flow regulator 170 has a non-zero second flow area that is larger than the first flow area. As the turbine engine 20 is powered up, a mitigated (e.g., due to venting) pressure of the buffer air within the buffer cavity 124 increases and approaches a maximum allowable pressure. The maximum buffer air threshold is set at a point 180 below the maximum allowable pressure such that the flow regulator 170 opens; e.g., moves from the low flow position to the high flow position. By increasing the flow area through the flow regulator 170, additional combined air may be vented from the LP cavity 140 to the pressure sink 174. The flow regulator 170 may thereby reduce the mitigated pressure of the buffer air within the buffer cavity 124 to a lower level; e.g., see point 181. The set point 180 may be selected to provide a pressure margin between the maximum buffer air threshold and the maximum allowable pressure to account for: possible variation in flow regulator operation; possible deterioration of the flow regulator; and/or hysteresis in flow regulator actuation. By contrast, the first flow area of the flow regulator 170 may be set such that the leakage air flowing across each buffer seal devices 150 and 154 is greater than the minimum leakage air threshold. This minimum leakage air threshold may be selected to be equal to or greater than a minimum allowable flowrate for certain operation of the respective buffer seal device 150, 154. Note, the performance characteristic (e.g., ΔTSFC) and the buffer seal flow (e.g., the leakage air flow) are normalized in FIG. 5 (and FIG. 6 described below).

Figure 6:
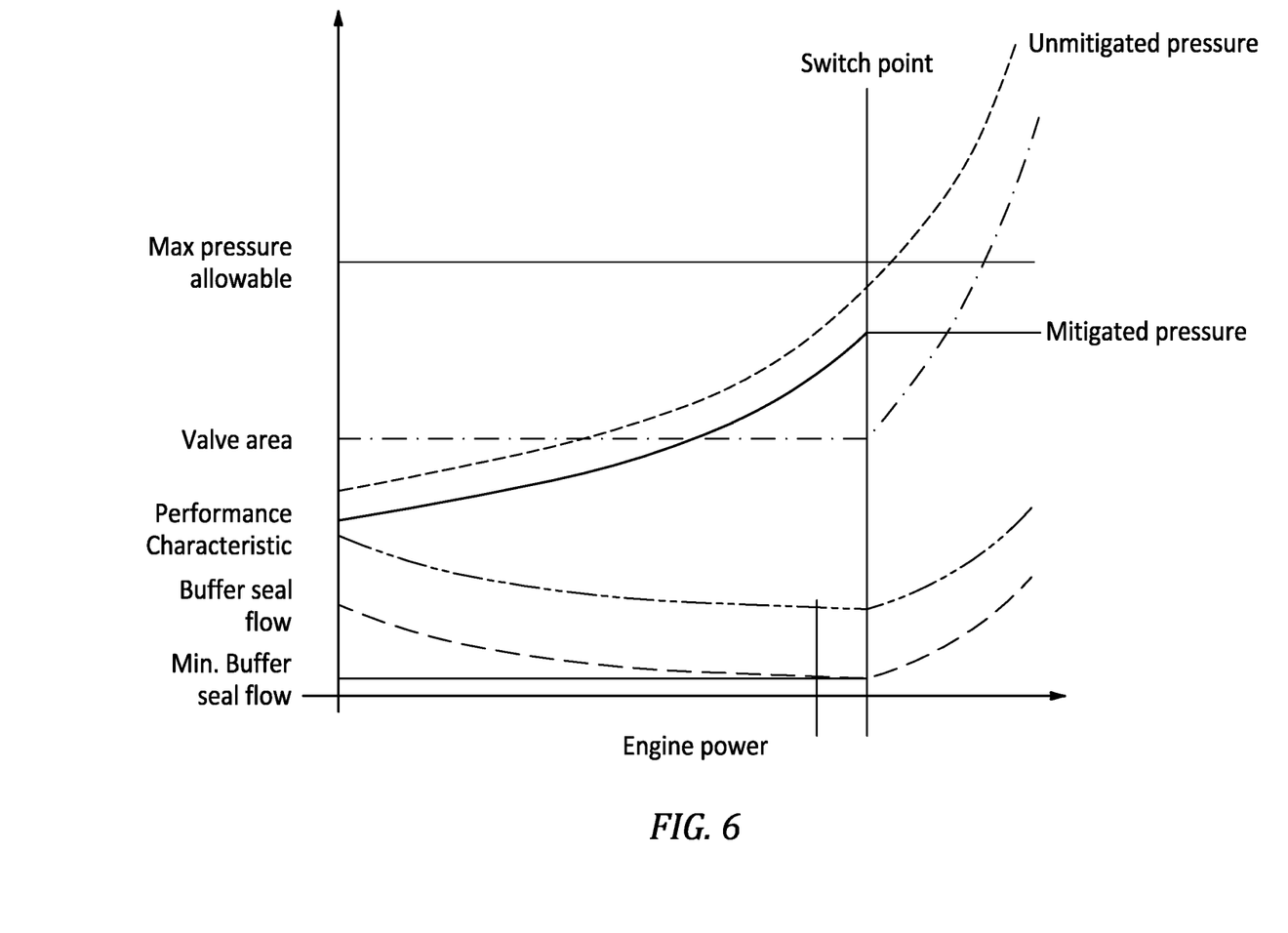
FIG. 6 is a graphical depiction of operation of the engine assembly with a variable position valve.

FIG. 6 is a graphical depiction of operation of the engine assembly 70 where the flow regulator 170 is configured as a variable position valve; e.g., a variable area valve. The flow regulator 170, for example, is operable to adjust (e.g., anywhere, or at various increments) between a low flow position and a high flow position. With such a configuration, the flow regulator 170 may be operated to maintain the mitigated pressure of the buffer air within the buffer cavity 124 at (or about) the maximum buffer air threshold, for example, once the mitigated pressure reaches the maximum buffer air threshold. Thus, step changes in buffer pressure may be minimized and potential dynamic responses in other parts of the turbine engine internal air system may be avoided. In addition, providing a wider set of operating conditions may reduce performance impacts since an increase in combined air venting is gradually increased.

In some embodiments, the flow regulator 170 of FIG. 2 (e.g., the discrete position valve or the variable position valve) may be controlled based on an operation parameter (or parameters) of the turbine engine 20. The control system 178, for example, may monitor the operational parameter using data from a sensor system and/or model data. Based on a value of this monitored operation parameter, the control system 178 may signal the flow regulator 170 to open or close to regulate the venting of the combined air to the pressure sink 174. Examples of the operational parameter include, but are not limited to, rotor speed, pressure, temperature, torque, thrust and flowrate.

Figure 7A:
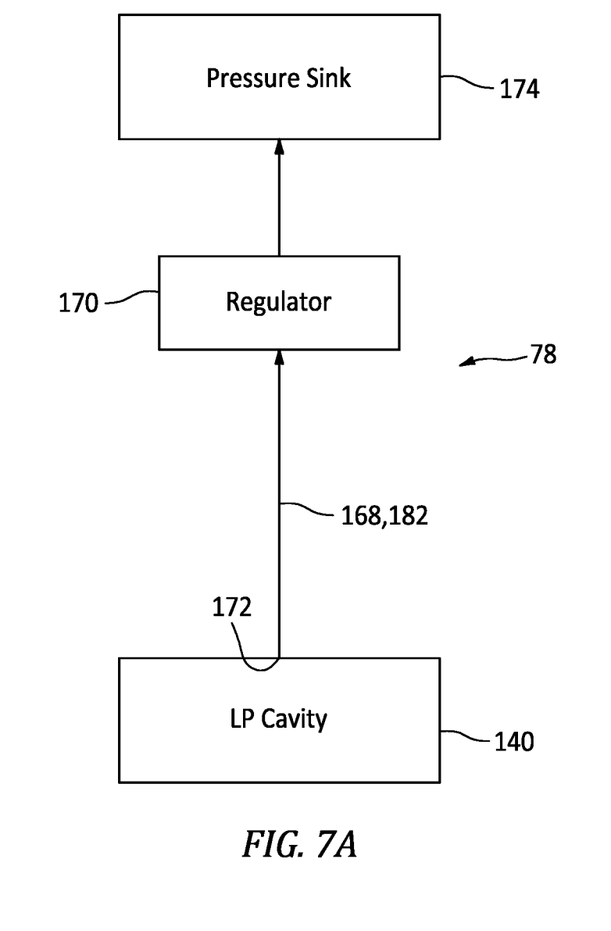
FIGS. 7A and 7B are schematic illustrations of various air relief systems between a low pressure cavity and a pressure sink.
Figure 7B:
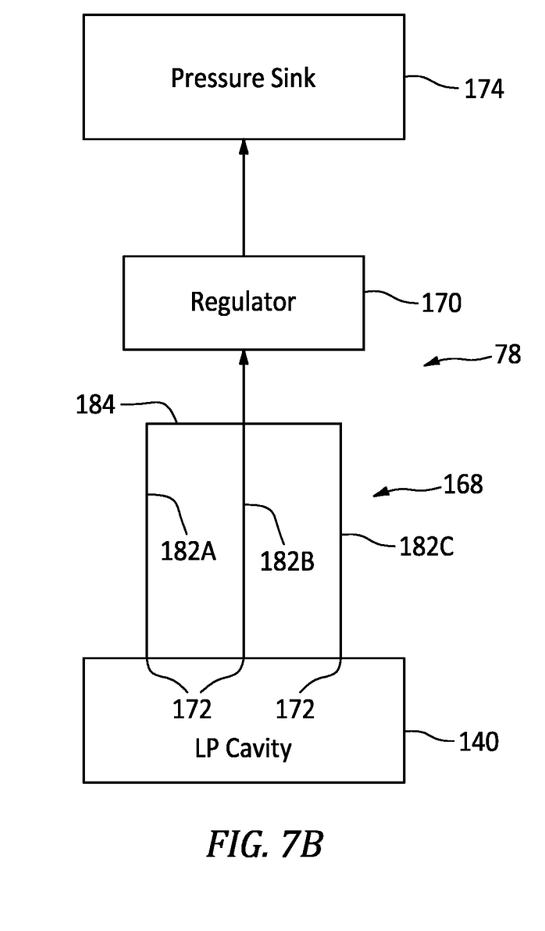

In some embodiments, referring to FIG. 7A, the vent line 168 may include a single leg 182 between the LP cavity 140 and the flow regulator 170. In other embodiments, referring to FIG. 7B, the vent line 168 may include multiple legs 182A-C (generally referred to as "182") between the LP cavity 140 and the flow regulator 170. Each vent line leg 182 may be fluidly coupled to the LP cavity 140 at a respective port 172. The vent line legs 182 may then combine via a manifold 184 before (or after) extending across the core flowpath 62 (see FIGS. 1 and 2), and upstream of the flow regulator 170.

The engine assembly 70 is described above in relation to the combustion section and its diffuser structure 86. It is contemplated, however, the engine assembly 70 may alternatively be configured for other sections of the turbine engine 20; e.g., within the turbine section 31. The present disclosure therefore is not limited to the exemplary arrangement of FIGS. 2-4.

The engine assembly 70 may be included in various turbine engines other than the exemplary gas turbine engine described above. The engine assembly 70, for example, may be included in a geared turbine engine where a geartrain connects one or more shafts to one or more rotors in a fan section, a compressor section and/or any other engine section. Alternatively, the engine assembly 70 may be included in a turbine engine configured without a geartrain; e.g., a direct drive turbine engine. The engine assembly 70 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
    flowing buffer air into a buffer cavity in a turbine engine, the buffer cavity surrounding a bearing compartment in the turbine engine;
    flowing leakage air across a buffer seal device in the turbine engine;
    combining the buffer air and the leakage air to provide combined air; and
    venting the combined air to a pressure sink such that
        a pressure of the buffer air within the buffer cavity is maintained at or below a maximum buffer air threshold during operation of the turbine engine; and
        a flowrate of the leakage air across the buffer seal device is maintained at or above a minimum leakage air threshold during the operation of the turbine engine.

2. The method of claim 1, wherein the combined air is vented to the pressure sink through a valve.

3. The method of claim 2, wherein the valve is configured as a discrete position valve.

4. The method of claim 2, wherein the valve is configured as a variable position valve.

5. The method of claim 2, further comprising controlling operation of the valve using an electronic control system for the turbine engine.

6. The method of claim 2, further comprising:
    monitoring an operational parameter of the turbine engine; and
    controlling operation of the valve based on the operational parameter.

7. The method of claim 1, wherein at least some of the combined air is vented to the pressure sink throughout the operation of the turbine engine.

8. The method of claim 1, wherein
    the leakage air flows across the buffer seal device from a high pressure cavity in the turbine engine to a low pressure cavity in the turbine engine;
    the buffer air is combined with the leakage air in the low pressure cavity;
    the low pressure cavity surrounds the buffer cavity; and
    the high pressure cavity surrounds the low pressure cavity.

9. The method of claim 8, wherein
    a low pressure cavity wall in the turbine engine includes a sidewall and an endwall;
    the sidewall is radially between and forms the low pressure cavity and the high pressure cavity;
    the endwall projects radially inward from the sidewall, and the endwall is axially between and forms the low pressure cavity and the high pressure cavity; and
    the buffer seal device seals a gap between the endwall and a rotating structure in the turbine engine.

10. The method of claim 8, wherein at least one of
    the buffer cavity is radially adjacent the bearing compartment;
    the low pressure cavity is radially adjacent the buffer cavity; or
    the high pressure cavity is radially adjacent the low pressure cavity.

11. The method of claim 8, wherein at least one of
    the buffer cavity axially overlaps the bearing compartment;
    the low pressure cavity axially overlaps the buffer cavity; or
    the high pressure cavity axially overlaps the low pressure cavity.

12. The method of claim 8, wherein
    a diffuser plenum in the turbine engine surrounds the high pressure cavity; and
    a combustor in the turbine engine is disposed within the diffuser plenum.

13. The method of claim 8, wherein the high pressure cavity is radially inboard of a core flowpath within the turbine engine.

14. The method of claim 1, wherein a bearing compartment wall in the turbine engine includes
    a sidewall radially between and forming the bearing compartment and the buffer cavity;

a first endwall projecting radially inward from the sidewall, the first endwall axially between and forming the bearing compartment and the buffer cavity; and a second endwall projecting radially inward from the sidewall, the second endwall axially between and forming the bearing compartment and the buffer cavity.

15. The method of claim 1, wherein a bearing compartment wall in the turbine engine is disposed between and forms the bearing compartment and the buffer cavity;

each of a plurality of bearing seal devices in the turbine engine seal a respective gap between the bearing compartment wall and a rotating structure in the turbine engine; and the bearing compartment is disposed axially between the plurality of bearing seal devices.

16. The method of claim 1, wherein both the buffer cavity and the bearing compartment are formed by a stationary structure and a rotating structure in the turbine engine.

17. An assembly for a turbine engine, comprising:

a stationary structure forming a bearing compartment, a buffer cavity, a low pressure cavity and a high pressure cavity, the buffer cavity outboard of the bearing compartment, the low pressure cavity outboard of the buffer cavity, and the high pressure cavity outboard of the low pressure cavity;

a vent line fluidly coupled with the low pressure cavity, the low pressure cavity configured to direct leakage air from the high pressure cavity and buffer air from the buffer cavity into the vent line as low pressure air;

a valve fluidly coupled with and downstream of the vent line; and a control system configured to signal the valve to control venting of the low pressure air from the low pressure cavity through the vent line such that a pressure of the buffer air within the buffer cavity is maintained at or below a maximum buffer air threshold; and a flowrate of the leakage air across the buffer seal device is maintained at or above a minimum leakage air threshold.

18. The assembly of claim 17, wherein the valve is configured as one of a two-position valve and a variable position valve.

* * * * *